Sept. 15, 1964 W. B. NODWELL 3,148,920
GROUSER BAR PAD
Filed Dec. 12, 1961
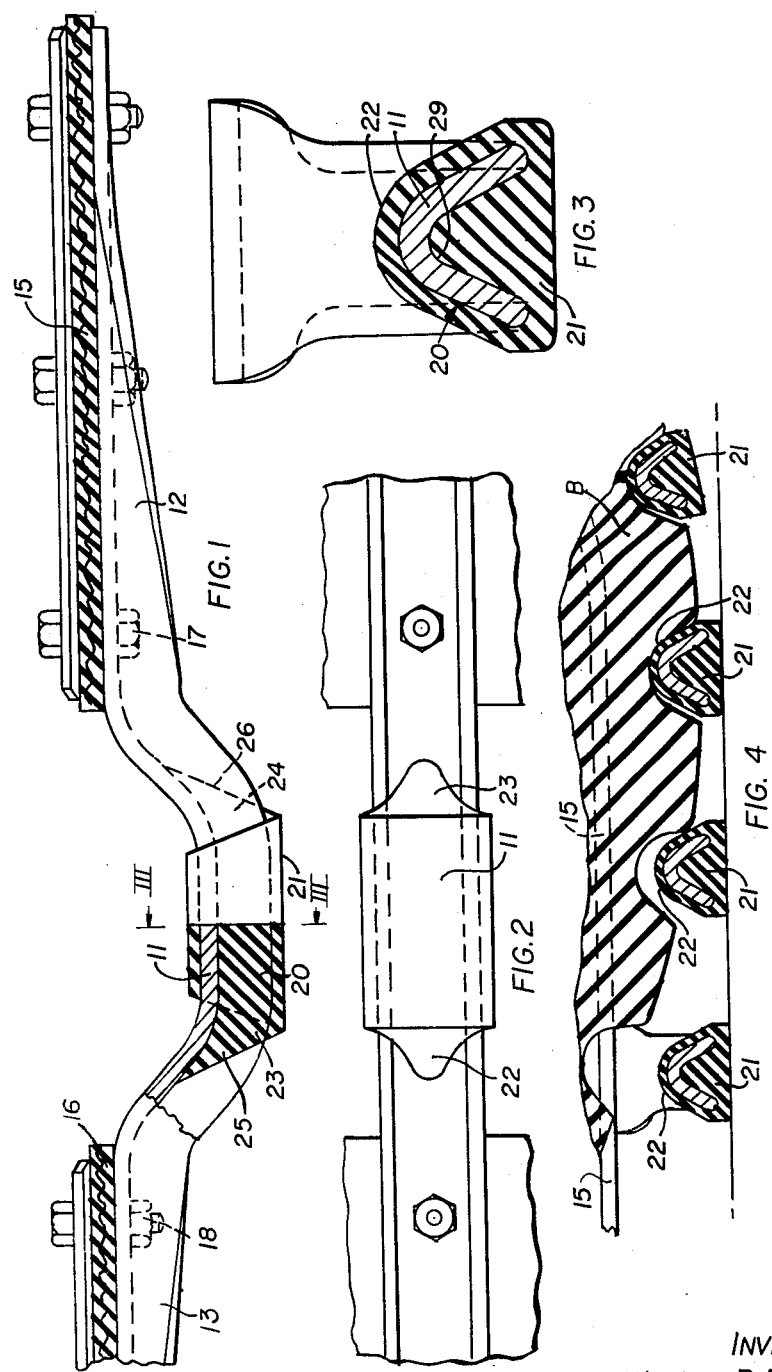
INVENTOR
WILLIAM B. NODWELL
BY- Smart & Biggar
ATTORNEYS.

United States Patent Office 3,148,920
Patented Sept. 15, 1964

3,148,920
GROUSER BAR PAD
William Bruce Nodwell, R.R. 4, Calgary,
Alberta, Canada
Filed Dec. 12, 1961, Ser. No. 158,788
1 Claim. (Cl. 305—35)

This invention relates to grouser bars for endless tracks and particularly to grouser bars for those types of track which are commonly referred to as "ladder" type. Such a track is described in my United States Patent No. 2,893,787 issued July 7, 1959.

The life of grouser bars on tracks operating continuously in sandy soil is seriously reduced by the ingress of sand particles between the grouser bars and the bogie wheels. The action of the bogie wheels causes the wheel engaging side of the central portion of the grouser bars to be abraded away by the sand particles. The bogie wheel tire is usually unaffected by this action.

A further disadvantage of known grouser bars is that they tend to damage the surface of paved highways with a result that vehicles equipped with such grouser bars are prohibited from travelling under their own power on highways and have to be transported.

Attempts have been made to provide pads on the ground engaging portions of known grouser bars but these prior attempts suffer from the disadvantage of very short life for the pads and a high maintenance requirement.

In order to overcome this disadvantage the present inventor provides a pad of resilient material of rubber or plastic bonded to the central portion of the grouser bar and completely encasing it. In this manner the inventor provides a protected bogie wheel engaging surface and a protected ground engaging surface for the grouser bar and also provides a large bonding area which gives the pad a long life.

Although this solution improves the life of the grouser bar the inventor has found that many rubber and plastic materials break down after prolonged used. The inventor has found however that an unexpectedly high improvement is obtained if the pad is formed from a material known under the trade name of Flexicast number 1001 made by Industrial Tire Limited of Toronto, Ontario. This material cannot be accurately described chemically since its composition is the secret of the aforementioned company, nevertheless it can be described as an ether base polyurethane produced by reaction of a polyol with isocyanate and amine. It has a specific gravity of 1.10 and a hardness, determined by an "A" Shore Durometer of between 85 and 90 degrees. It is an important feature of the present invention that the pad be made of this material.

The following is a description by way of example of one embodiment of the present invention, reference being had to the accompanying drawings in which:

FIGURE 1 is a view of a grouser bar as seen when looking in the longitudinal direction of the endless track, the left hand side track-engaging-portion being broken away;

FIGURE 2 is a underneath plan view of the central portion of the grouser bar;

FIGURE 3 is a section taken on the line III—III of FIGURE 1; and

FIGURE 4 is a side view, in section, of part of a track assembly.

Referring now to the drawings, a grouser bar 10 has a central ground-engaging and bogie wheel engaging portion 11 and a pair of integral lateral track engaging portions 12, 13 extending outwardly therefrom. The portions 12 and 13 are bolted to the endless tracks 15, 16 by bolts 17, 18 in known manner.

The central portion 11 of the grouser bars is of a substantially inverted U cross section (as seen in FIG. 3) and has bonded thereto a pad member 20 of resilient material selected from the group consisting of a rubber and a plastic and preferably of Flexicast number 1001.

As best seen in FIG. 3 the grouser bar central portion 11 is completely encased by the pad 20 and presents a ground engaging surface 21 to the outside and a curved bogie wheel-tire engaging surface 22 to the inside. In this manner sand particles which would in known constructions abrade the grouser bars are squeezed relatively harmlessly between the tires B (FIG. 4) of the bogie wheels and the inside surface 22.

The ground engaging surface permits the vehicle to travel on paved highways and it will be observed (FIG. 1) that the pad is so formed as to provide as large a ground engaging surface as possible.

Furthermore it will be observed (FIGS. 2, 3) that a large bonding surface is provided between grouser bar 11 and pad 20. This bonding area is improved by the provision of extended wings 23, 24 which are bonded to the surface 29 of the grouser bar. The sloping sides 25, 26 of the wings resist the tendency for the sideways thrust of gravel and the like to tear the pad loose from the grouser bars during steering.

The expression "central portion" as used hereinbefore and hereinafter in the claims is intended to include the central portion of between belt sections in grouser bars which span more than two endless belts which together form one endless track.

What I claim as my invention is:

In a grouser bar for an endless track vehicle having a plurality of load-bearing bogie wheels supporting a vehicle on a pair of ladder tracks, each of said ladder tracks including a pair of endless belts, an elongated member of inverted U-shaped cross-section when in ground-engaging position extending transversely with respect to the plane of the bogie wheel and having a downwardly arched central portion, said central portion being completely encased by an integrally formed pad member of resilient material bonded thereto, the upper bogie wheel-engaging surface of the pad member having a generally arcuate configuration, the lower portion of the pad member having a substantially flat ground-engaging surface, the respective ends of said pad member terminating in upwardly and outwardly inclined flat surfaces bridging the interior of said U-shaped central portion and extending along the interior sides of the downwardly arched central portion for resisting side thrust on the pad member, said elongated member having belt-engaging end portions extending outwardly beyond both ends of said pad member, said end portions being upwardly and outwardly tapered and being spaced above the ground along their entire length to minimize the possibility of contact with the ground when running on flat surfaces.

References Cited in the file of this patent
UNITED STATES PATENTS

| | | |
|---|---|---|
| 1,258,612 | Holt | Mar. 5, 1918 |
| 2,162,700 | Christmas | June 20, 1939 |
| 2,429,242 | Slemmons | Oct. 21, 1947 |
| 2,430,986 | Kline et al. | Nov. 18, 1947 |
| 2,515,128 | Lammertse | July 11, 1950 |
| 2,731,304 | Kubaugh | Jan. 17, 1956 |
| 2,786,725 | Thorne | Mar. 26, 1957 |
| 2,903,304 | Henderson | Sept. 8, 1959 |
| 3,017,942 | Gamaunt | Jan. 23, 1962 |